United States Patent [19]

Hallerbäck

[11] Patent Number: 4,804,354
[45] Date of Patent: Feb. 14, 1989

[54] DRIVING WHEEL WITH A BELT PULLEY

[75] Inventor: Stig Hallerbäck, Vastra Frolunda, Sweden

[73] Assignee: SKF Nova AB, Gothenburg, Sweden

[21] Appl. No.: 113,560

[22] Filed: Oct. 27, 1987

[30] Foreign Application Priority Data

Oct. 27, 1986 [SE] Sweden .................................. 8604570

[51] Int. Cl.$^4$ .............................................. F16H 55/36
[52] U.S. Cl. ..................................... 474/902; 474/174
[58] Field of Search ............... 474/174, 159, 177, 166, 474/902, 903; 29/159 R, 159.2, 159.3

[56] References Cited

U.S. PATENT DOCUMENTS 4,600,400 7/1986 Hallerback ...................... 474/174 X Primary Examiner—Thuy M. Bui
Attorney, Agent, or Firm—Eugene E. Renz, Jr.

[57] ABSTRACT

The invention relates to a driving wheel for car engines or the like, incorporating a gear wheel, which is intended to cooperate with a cogged belt, and a pulley attached to one side of the gear wheel and arrested to this. The gear wheel molded from a plastic or similar material having a coefficient of thermal expansion higher than steel's coefficient of thermal expansion and by having a helix of steel or another material with a coefficient of thermal expansion similar to or identical with that of steel embedded in the gear of the wheel radially inside the cogs, whereby the helix has such strength and dimension that it determines the thermal expansion properties of the gear rim.

4 Claims, 1 Drawing Sheet

U.S. Patent
Feb. 14, 1989
4,804,354
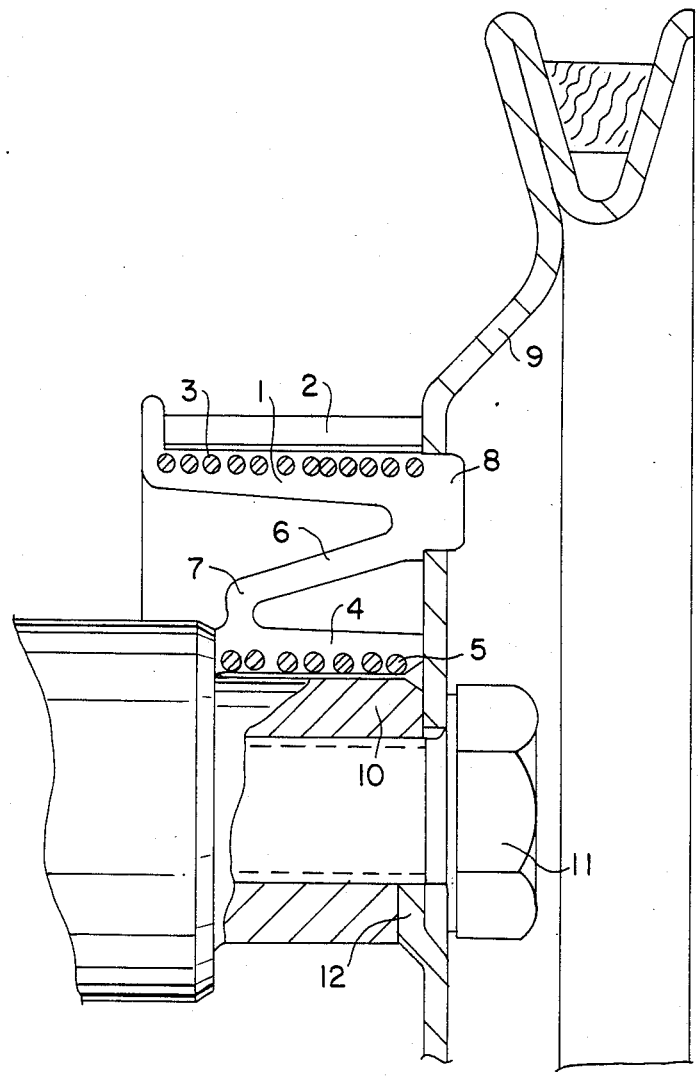

025B
DRIVING WHEEL WITH A BELT PULLEY

FIELD OF THE INVENTION

The present invention relates to driving wheels with belt pulleys. More particularly, it relates to using such wheels in connection with car engines.

BACKGROUND OF THE INVENTION

A large number of different driving wheels with pulleys are known. They are usually mounted at the front of an engine upon a protruding drive shaft. The driving wheels commonly cooperate with driving belts for driving further devices such as a dynamo. The driving wheels are subjected to rigid requirements. They are required to be reliable under different temperature conditions and be accurate as transferred motions must be synchronized with each other.

The driving wheels generally consist of a gear wheel with ledge-shaped, axially directed cogs and a sheet metal pulley screwed thereto. It is essential that no rotation of the pulley in relation to the gear wheel occurs. It is also important that the gear wheel fitted to a shaft not move in relation to the shaft. To achieve this lack of movement and rotation, there has been provided a central screw, which connects the driving wheel to the shaft, and a plurality of more peripherally situated screws, which connect the pulley to the gear wheel.

The driving wheels are commonly manufactured by means of powder metallurgy, and the material employed is a steel alloy. The wheels may also be forged.

SUMMARY OF THE INVENTION

It has been a desideratum for many years to be able to produce driving wheels of the above-mentioned type, which are simple in design and low in weight. It is particularly important that the driving wheels can be assembled in a simple manner by robots. For such assembly to be appropriate and rapid, the number of components, such as screws, should be kept to a minimum. One of the drawbacks of known devices is the large number of screws they require.

The aforementioned problems experienced with known driving wheels have been solved in accordance with the present invention. This invention provides a light driving wheel with a pulley for car engines or the like, which incorporates a gear wheel with axial, ledge-shaped teeth, intended to cooperate with the cogs of a cogged belt and a pulley attached to one side of the gear wheel and arrested thereto. The present invention is further characterized by having the gear wheel molded from a plastic such as a glass fiber reinforced polyamide or a duroplastic or similar material having a coefficient of thermal expansion higher than that of steel, for example, 2.5 to 6 times greater than that of steel, and a helix of steel or another material with coefficient of thermal expansion similar to or identical with that of steel, the helix being embedded in the gear rim of the wheel radially inside the teeth, and being of such strength and dimension that it determines the thermal expansion properties of the gear rim.

The driving wheel according to the invention are designed so that the gear wheel at its side facing the pulley is equipped with lugs intended to cooperate with recesses in the cogged belt for locking this against rotation relative to the gear wheel.

The hub of the gear wheel according to the invention can also be provided with a helix of steel or another material with a coefficient of thermal expansion similar to or identical with that of steel and of such a strength that it determines the thermal expansion properties of the entire hub.

Inasmuch as plastic materials have coefficients of thermal expansion, i.e. higher than steel, for instance 2.5 to 6 times that of steel, it is appropriate for avoiding material stresses that the intermediate part in the gear wheel interconnecting the hub and the gear rim is provided with knees having the ability of absorbing dimensional deformations in the wheel.

BRIEF DESCRIPTION OF THE DRAWINGS

The invention herein being claimed will be further described with reference to the accompanying drawing, which shows a section through a driving wheel having a sheet metal pulley. It is to be understood that the driving wheel of this invention is not a driven wheel which carries the car but a wheel which carries a belt which drives from the dynamo, the water pump or the like.

DETAILED DESCRIPTION OF THE PREFERRED EMBODIMENT

In the FIGURE there is shown a gear wheel having a gear rim 1 with axially extending, ledge-shaped teeth 2. Inside these there is inserted a steel helix 3. This has been embedded prior to the molding of the molding mass. The molding mass which in this case is plastic material has been inserted into a mold with somewhat smaller diameter than the helix 3. After the molding mass has been injected, the helix gets a slight pretension. In order to ascertain that the teeth bottoms to the major part are filled with plastic material some of the teeth of the mold, e.g. each fifth tooth has been equipped with a rule, which retains the helix 3 at some distance from the teeth.

The FIGURE further shows a hub 4 on the gear wheel, which hub 4 is also reinforced with a steel helix 5 of desired strength. Between the hub 4 and the gear rim 1 extends an intermediate portion 6. This is provided with appropriate knees 7 for compensating dimensional deformations caused by temperature changes.

A characteristic detail at the gear rim 1 is that it is provided with projecting bosses 8 of appropriate number, e.g. 4. These bosses 8 are intended to prevent rotation of the sheet metal pulley 9 in relation to the gear wheel.

As can be seen from the FIGURE the driving wheel with sheet metal pulley has been mounted on the shaft 10 by means of one single screw or bolt 11. The shaft on which the hub has been mounted is the driving shaft protruding out of the motor block. The sheet metal pulley can be smooth and only clamped between the shaft 10 and the bolt 11, such as shown at the upper side of the bolt, but it may also be equipped with lugs 12 entering in recesses in the shaft 10, as an additional safety device against unintentional rotation.

The hub 4 of the gear wheel may also be secured against rotation in relation to the shaft 10 in that plane surfaces are provided in the internal surface of the hub, which plane surfaces cooperate with corresponding surfaces on the shaft 10.

An advantage of the present invention is that it makes possible using only one screw or bolt 11 for mounting the driving wheel with pulley upon the shaft 10. Such mounting ensures that no rotation of the components in relation to each other occurs and that the thermal expansion of the gear wheel follows that of the steel, although it is primarily made of plastic or similar material having a coefficient of thermal expansion higher than that of steel.

If it is desired, for example, to exchange the cogged belt pulley, this is possible in that the pulley 9 is removed, whereupon it is necessary to loosen only one screw 11.

The invention is not limited to the embodiment shown but can be modified in different manners within the scope of the claims.

What is claimed is:

1. A driving wheel with a belt pulley for car engines or the like, incorporating a gear wheel with axial, ledge-shaped teeth, intended to cooperate with the cogs of a cogged belt and a pulley attached to one side of the gear wheel and arrested thereto, characterized by having the gear wheel molded from a plastic or similar material having a coefficient of thermal expansion higher than that of steel and having a helix of steel or another material with a coefficient of thermal expansion similar to or identical with that of steel embedded in a gear rim of said gear wheel radially inside the teeth, said helix having such strength and dimension that it determines the thermal expansion properties of the gear rim.

2. The driving wheel as claimed in claim 1 wherein the gear wheel at its side facing the pulley equipped with lugs intended to cooperate with recesses in the cogged belt for locking this against rotation relative to the gear wheel.

3. The driving wheel as claimed in claim 1 wherein the hub of the gear wheel provided with a helix of steel or another material with a coefficient of thermal expansion similar to or identical with that of steel and of such a strength, that it can determine the thermal expansion properties of the entire hub.

4. The driving wheel as claimed in claim 1 further having an intermediate part in the gear wheel, interconnecting the hub and the gear rim, said rim being provided with knees having the ability of absorbing dimensional deformations in the wheel.

* * * * *